US009418494B2

(12) United States Patent
Jin et al.

(10) Patent No.: US 9,418,494 B2
(45) Date of Patent: Aug. 16, 2016

(54) APPARATUS AND METHOD FOR PROVIDING REAL-TIME INFORMATION USING ANALYSIS FACTOR BASED ON ROAD AND TRAFFIC CONDITIONS

(71) Applicant: THINKWARE SYSTEMS CORPORATION, Seoul (KR)

(72) Inventors: Hyung Min Jin, Seoul (KR); Deuk Yeong Seong, Seoul (KR); Tae Hyeon Park, Seoul (KR)

(73) Assignee: THINKWARE CORPORATION, Gyeonggi-Do (KR)

( * ) Notice: Subject to any disclaimer, the term of this patent is extended or adjusted under 35 U.S.C. 154(b) by 17 days.

(21) Appl. No.: 13/662,812

(22) Filed: Oct. 29, 2012

(65) Prior Publication Data

US 2013/0113615 A1 May 9, 2013

Related U.S. Application Data

(60) Provisional application No. 61/555,779, filed on Nov. 4, 2011.

(30) Foreign Application Priority Data

Feb. 3, 2012 (KR) ........................ 10-2012-0011345

(51) Int. Cl.
*B60Q 1/00* (2006.01)
*G07C 5/08* (2006.01)

(52) U.S. Cl.
CPC .................................... *G07C 5/0825* (2013.01)

(58) Field of Classification Search
CPC ....... G08G 1/0967; G08G 1/161; G08G 1/09; G08G 9/02; G08G 1/202; G08G 1/0112; G08G 1/0129; G08G 1/052; B60Q 1/00; B60Q 9/008; B60Q 9/00; G08B 21/18; G08B 21/02; G08B 21/22; G08B 1/08; H04W 4/02; H04W 64/006; H04W 76/002; G07C 5/008; G07C 1/10; G06Q 10/08; G06Q 10/0631; G06Q 10/083; G06Q 50/22; G06Q 50/24
USPC ....................... 340/438–441, 426.18–426.19, 340/903–905, 539.13, 539.2, 995.1–996
See application file for complete search history.

(56) References Cited

U.S. PATENT DOCUMENTS

2006/0131093 A1* 6/2006 Egami .................... B60N 2/449 180/272
2007/0216521 A1* 9/2007 Guensler .............. G08G 1/0104 340/439
2008/0024323 A1* 1/2008 Kadaba ............. G01N 33/0075 340/905
2011/0004397 A1* 1/2011 Nagase .................... G08G 1/01 701/119
2011/0057784 A1* 3/2011 Nakamura ........... B60W 40/08 340/439
2011/0160993 A1* 6/2011 Tsurutani ........... G01C 21/3469 701/532
2011/0307204 A1* 12/2011 Cho ........................ B60T 8/172 702/96
2012/0019375 A1* 1/2012 Kataoka ................ B60W 50/14 340/439

* cited by examiner

*Primary Examiner* — George Bugg
*Assistant Examiner* — Sharmin Akhter
(74) *Attorney, Agent, or Firm* — Saliwanchik, Lloyd & Eisenschenk

(57) ABSTRACT

Provided is an apparatus and method for providing real-time information using an analysis factor of road and traffic conditions. The real-time information service apparatus may include a calculating unit to calculate at least one of a topographical factor related to a road and a behavioral factor related to a speed, and a providing unit to provide real-time notification information to a driver based on at least one of the topographical factor and the behavioral factor. The real-time notification information may include at least one of a light signal of an indicator lamp, an alarm signal, a video signal, and an audio signal.

18 Claims, 8 Drawing Sheets

| CLASSIFICATION | LAMP | ALARM |
|---|---|---|
| REGULAR DAY | BLUE LIGHT SIGNAL | - |
| START UP WITHOUT INITIAL WARM-UP | - | SHORT WARNING BEEP IN CASE OF START UP WITHIN TEN SECONDS OR START UP FAILURE WITHIN THIRTY SECONDS |
| EXCEEDING EACH VARIABLE | STEADY LIGHT SIGNAL WHEN BEHAVIORAL FACTOR IS LESS THAN REFERENCE VALUE FLASH LIGHT SIGNAL WHEN TOPOGRAPHICAL FACTOR IS LESS THAN REFERENCE VALUE | - |
| EXCEEDING TOTAL ANALYSIS INDEX | FLASH LIGHT SIGNAL WHEN BEHAVIORAL FACTOR IS LESS THAN REFERENCE VALUE STEADY LIGHT SIGNAL WHEN TOPOGRAPHICAL FACTOR IS LESS THAN REFERENCE VALUE | ALTERNATING ALARM UNTIL R INDEX MATCHES REFERENCE VALUE |

| | INSTANTANEOUS ACCELERATION ($m/s^2$) | INSTANTANEOUS CURVATURE(°) | INSTANTANEOUS GRADIENT(m) | INSTANTANEOUS SPEED (m/s) |
|---|---|---|---|---|
| A | 0 | 0~2 | 0 | 0~2.8 |
| B | 0~0.69 | 2~10 | 0~0.7 | 2.8~9.4 |
| C | 0.69~1.38 | 10~30 | 0.7~1.5 | 9.4~16.0 |
| D | 1.38~2.07 | 30~45 | 1.5~2.2 | 16.0~23.6 |
| E | 2.07~2.76 | 45~60 | 2.2~2.9 | 23.6~27.8 |
| F | 2.76~3.45 | 60~90 | 2.9~ | 27.8~ |

FIG. 4

| CLASSIFICATION | LAMP | ALARM |
|---|---|---|
| REGULAR DAY | BLUE LIGHT SIGNAL | - |
| START UP WITHOUT INITIAL WARM-UP | - | SHORT WARNING BEEP IN CASE OF START UP WITHIN TEN SECONDS OR START UP FAILURE WITHIN THIRTY SECONDS |
| EXCEEDING EACH VARIABLE | STEADY LIGHT SIGNAL WHEN BEHAVIORAL FACTOR IS LESS THAN REFERENCE VALUE FLASH LIGHT SIGNAL WHEN TOPOGRAPHICAL FACTOR IS LESS THAN REFERENCE VALUE | - |
| EXCEEDING TOTAL ANALYSIS INDEX | FLASH LIGHT SIGNAL WHEN BEHAVIORAL FACTOR IS LESS THAN REFERENCE VALUE STEADY LIGHT SIGNAL WHEN TOPOGRAPHICAL FACTOR IS LESS THAN REFERENCE VALUE | ALTERNATING ALARM UNTIL R INDEX MATCHES REFERENCE VALUE |

FIG. 6

APPARATUS AND METHOD FOR PROVIDING REAL-TIME INFORMATION USING ANALYSIS FACTOR BASED ON ROAD AND TRAFFIC CONDITIONS

CROSS-REFERENCE TO RELATED APPLICATIONS

This application claims the benefit under 35 U.S.C. §119 (e) of U.S. Provisional Application No. 61/555,779, filed Nov. 4, 2011, and of Korean Patent Application No. 10-2012-0011345, filed Feb. 3, 2012, which are hereby incorporated by reference in their entirety.

BACKGROUND

1. Field of the Invention

Exemplary embodiments of the present invention relate to an apparatus and method for providing real-time information using various factors affecting driving to create an economic driving environment.

2. Description of the Related Art

Recently, a need for objective materials to determine an allocation of liability in car accidents occurring while stopping or driving is increasing. Generally, a car black box is used to provide objective materials, however, an existing car black box only provides simple data associated with vehicle conditions, and thus fails to meet the demand of users effectively.

A navigation device provides map data in which a global positioning system (GPS) location is matched with a map, and guides a user along a requested route using the map data. The navigation device detects and displays driving information including travel distance and time, a maximum speed, and an average speed to allow the user to ascertain driving conditions. However, since an existing navigation device provides rather simple driving information to the user, the navigation device has a limitation in terms of enabling the user to recognize a driving habits or driving pattern of the user accurately.

Reference is made to Korean Patent Publication No. 10-2010-0110102, published on Oct. 12, 2010, disclosing an apparatus and method that analyzes a driving habit or driving pattern of a user accurately, calculates driving evaluation information from driving information, and displays the driving evaluation information to promote safer, more economical, and environmentally-friendly driving naturally.

However, the conventional driving evaluation information includes fuel efficiency, a travel speed, carbon emissions, and the like, and only represents information associated with safety and economic efficiency irrespective of road or traffic conditions. Accordingly, the conventional driving evaluation information simply corresponds to an index indicating a driving habit of a user irrespective of road or traffic conditions, and thus is unsuitable for use in setting a route.

Accordingly, there is a need for an apparatus and method for providing real-time information to create an economic driving environment using an analysis factor calculated based on actual road and traffic conditions as well as fuel efficiency.

BRIEF SUMMARY

An aspect of the present invention provides an apparatus and method for recognizing a factor affecting improvement of an eco-driving index in real time.

Another aspect of the present invention also provides an apparatus and method for providing real-time information to create an economic driving environment by recognizing various factors affecting driving in real time.

Still another aspect of the present invention also provides an apparatus and method for creating an economic driving environment while driving.

According to an aspect of the present invention, there is provided a real-time information service apparatus including a calculating unit to calculate at least one of a topographical factor related to a road and a behavioral factor related to a speed, and a providing unit to provide real-time notification information to a driver based on at least one of the topographical factor and the behavioral factor.

The topographical factor may include at least one of a gradient and a curvature of the road calculated per unit time, and the behavioral factor may include at least one of a speed in meters per second (m/s) and an acceleration in meters per second$^2$ (m/s$^2$) calculated per unit time.

The providing unit may generate a light signal of an indicator lamp as the real-time notification information when at least one of the topographical factor and the behavioral factor fails to match a reference value.

The providing unit may generate the light signal in different types of lights depending on the topographical factor and the behavioral factor.

The providing unit may generate an alarm signal as the real-time notification information when at least one of the topographical factor and the behavioral factor fails to match a reference value.

The providing unit may generate the alarm signal in different types of alarms depending on the topographical factor and the behavioral factor.

The providing unit may generate at least one of a video signal and an audio signal as the real-time notification information when at least one of the topographical factor and the behavioral factor fails to match a reference value.

The reference value may be determined through learning using log data of at least one of the topographical factor and the behavioral factor.

The calculating unit may grade the topographical factor and the behavioral factor.

A reference value for the grading may be determined through learning using log data of at least one of the topographical factor and the behavioral factor.

The providing unit may provide the real-time notification information in a type of signal being outputted from at least one terminal of a mobile terminal, a navigation terminal, and a black box.

The calculating unit may calculate at least one of the topographical factor and the behavioral factor for each unit section of the road.

The providing unit may display the topographical factor and the behavioral factor for each unit section through at least one terminal of a mobile terminal, a navigation terminal, and a black box.

At least one of the topographical factor for each unit section and the behavioral factor for each unit section may be used as reference data for setting a route.

According to another aspect of the present invention, there is provided a real-time information service method including calculating at least one of a topographical factor related to a road and a behavioral factor related to a speed, and providing real-time notification information to a driver based on at least one of the topographical factor and the behavioral factor.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIGS. 4 and 5 are diagrams illustrating an example of grading an acceleration, a curvature, a gradient, and a speed according to an exemplary embodiment of the present invention;

FIG. 6 is a diagram illustrating examples of a light signal of an indicator lamp and an alarm signal as real-time notification information according to an exemplary embodiment of the present invention;

DETAILED DESCRIPTION

Figure 1:
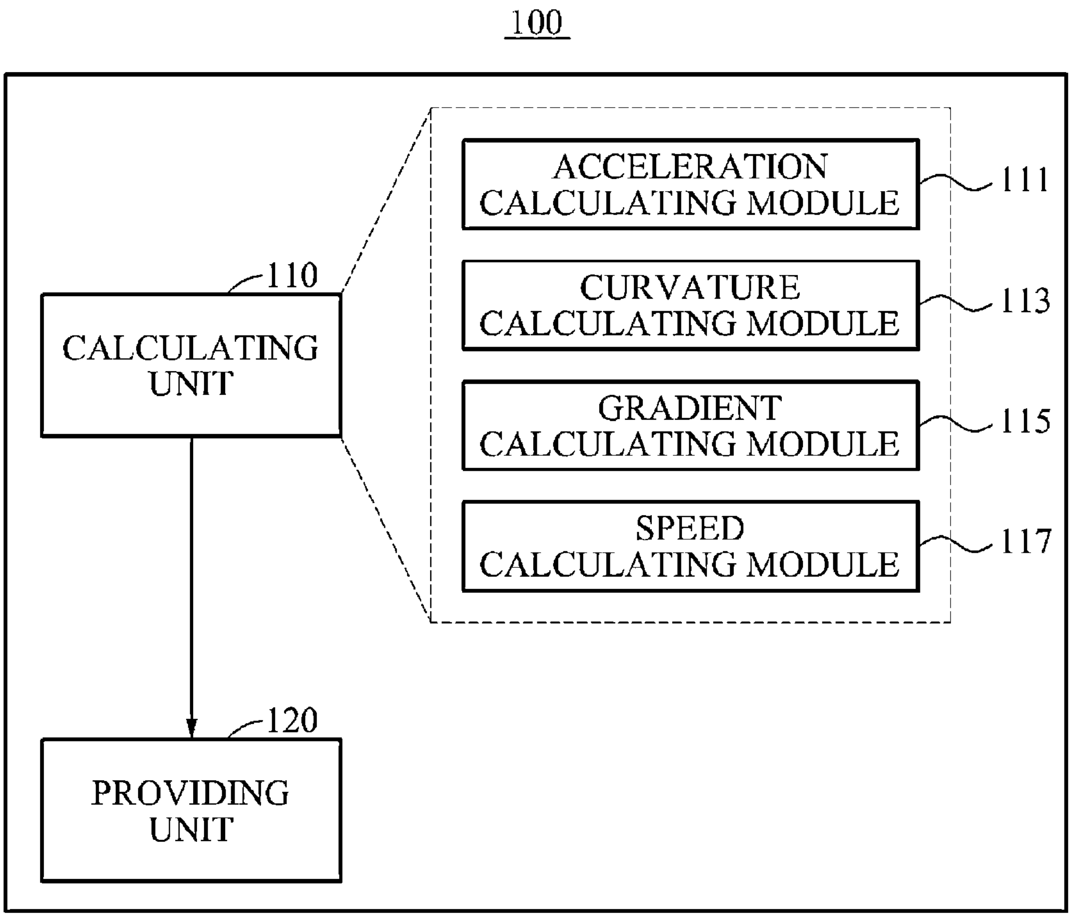
FIG. 1 is a diagram illustrating an internal structure of a real-time information service apparatus for providing real-time notification information about a factor affecting an eco-driving index according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The exemplary embodiments relate to a real-time information service apparatus and method for providing real-time notification information based on various factors affecting driving to create an economic driving environment.

The real-time information service apparatus and method according to the present invention may be applied to a car black box device, an on-board diagnostic (OBD) device, or a navigation device. The car black box device, the OBD device, or the navigation device may include a function of analyzing various factors affecting driving and of providing real-time notification information based on the analysis result. The exemplary embodiments may be implemented as an application dedicated for a mobile terminal, for example, a smart phone, a tablet, and the like, or may be implemented to interwork with a mobile terminal. The exemplary embodiments may provide real-time notification information through a mobile terminal based on various factors affecting driving.

FIG. 1 is a diagram illustrating an internal structure of a real-time information service apparatus 100 for providing real-time notification information about a factor affecting an eco-driving index according to an exemplary embodiment of the present invention.

Referring to FIG. 1, the real-time information service apparatus 100 according to an exemplary embodiment may include a calculating unit 110 and a providing unit 120. The calculating unit 110 may include at least one of an acceleration calculating module 111 and a speed calculating module 117, and at least one of a curvature calculating module 113 and a gradient calculating module 115. Although FIG. 1 shows that the acceleration calculating module 111, the curvature calculating module 113, the gradient calculating module 115, and the speed calculating module 117 are all included, the present invention is not limited to such an arrangement. For example, any of the acceleration calculating module 111, the curvature calculating module 113, the gradient calculating module 115, and the speed calculating module 117 may be omitted as necessary.

The calculating unit 110 may calculate, as a factor affecting driving, a topographical factor, for example, a shape of a road, and a behavioral factor, for example, a travel speed directly related to a driving pattern of a driver. Here, the topographical factor may include at least one of a horizontal alignment curvature (hereinafter referred to as, a curvature) and a vertical alignment gradient of a road (hereinafter referred to as, a gradient), and the behavioral factor may include at least one of a rate of speed change (hereinafter referred to as, an acceleration) and a constant speed drive (hereinafter referred to as, a speed) while driving.

In the exemplary embodiment, global positioning system (GPS) information providing a location of a vehicle may be used to calculate the topographical factor and the behavioral factor. The real-time information service apparatus 100 according to an exemplary embodiment may obtain necessary information directly from a GPS module included in the real-time information service apparatus 100, or may receive necessary information from a GPS module provided in a device with which the real-time information service apparatus 100 may interwork.

Also, an image taken with a car front view camera, an output value from an inclination sensor sensing an inclination of a vehicle, or an output value from a speed sensor sensing a speed of a vehicle may be used to calculate the topographical factor and the behavioral factor. In turn, the real-time information service apparatus 100 may obtain necessary information directly from a car front view camera, an inclination sensor, and a speed sensor included in the real-time information service apparatus 100, or may receive an input of necessary information from a car front view camera, an inclination sensor, and a speed sensor provided in a device with which the real-time information service apparatus 100 may interwork.

The acceleration calculating module 111 may calculate an acceleration while driving. The speed calculating module 117 may calculate a speed while driving. In this instance, the acceleration may refer to an index indicating a rate of speed change per unit time in meters per second$^2$ ($m/s^2$), and may correspond to a variable speed caused by acceleration and deceleration. The speed may refer to an index indicating a constant speed drive in meters per second (m/s), and may correspond to a speed variation. The acceleration and the speed may be calculated using GPS information providing a location of a vehicle or an output value of a speed sensor sensing a speed of a vehicle.

Figure 2:
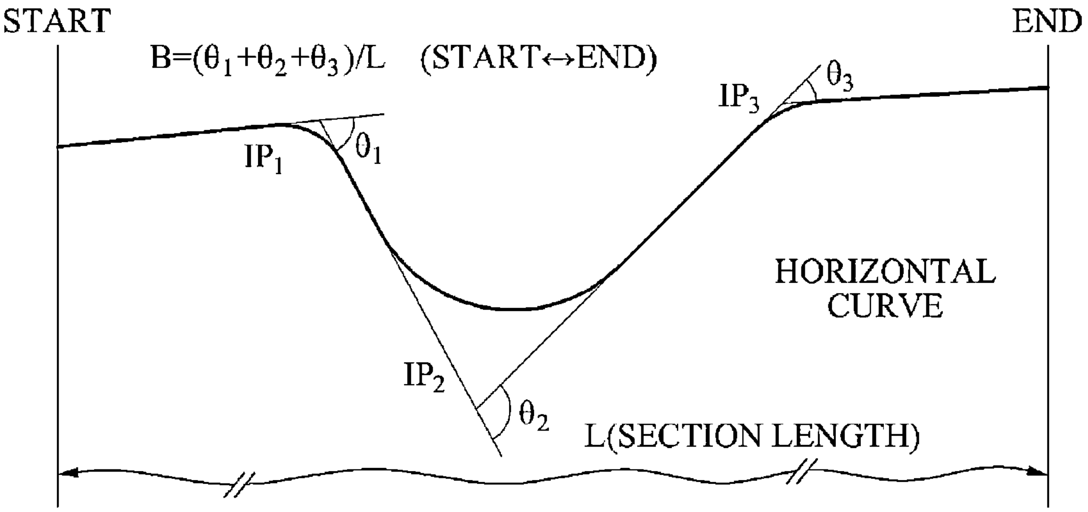
FIG. 2 is a diagram illustrating calculation of a curvature of a roadway according to an exemplary embodiment of the present invention.

The curvature calculating module 113 may calculate a curvature of a road. In this instance, the curvature calculating module 113 may calculate the curvature by calculating a change in intersection angle of a horizontal curve for the road. The curvature may be represented in degrees/kilometer (°/km), and may refer to an index indicating a degree of curving of the horizontal curve. The curvature may be calculated by obtaining an intersection angle at each intersection point between horizontal lines per unit section length, and by calculating a sum of the intersection angles. Referring to FIG. 2, the intersection angles may correspond to angles $\theta_1$, $\theta_2$, and $\theta_3$ of deflection at intersection points $IP_1$, $IP_2$, and $IP_3$ of the horizontal curve, respectively. The curvature calculating module 113 may calculate the curvature by calculating an intersection angle at each intersection point between horizontal lines in the horizontal curve and by calculating a sum of the intersection angles. When a length of a unit section is 'L', the curvature B may be calculated to be '$(\theta_1+\theta_2+\theta_3)/L$'. In this instance, the curvature calculating module 113 may calculate the curvature by obtaining the horizontal curve of the road using GPS information providing a location of a vehicle or an image taken with a car front view camera, and by calculating a change in intersection angle of the horizontal curve.

Figure 3:
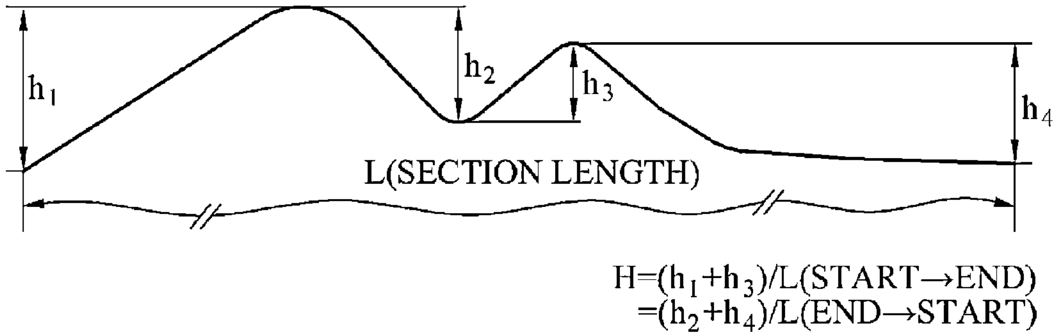
FIG. 3 is a diagram illustrating calculation of a gradient of a roadway according to an exemplary embodiment of the present invention.

The gradient calculating module 115 may calculate a gradient of the road. In this instance, the gradient calculating module 115 may calculate the gradient using a difference in grade of a vertical curve for the road. The vertical alignment gradient may be represented in °/km or m/km, and may refer to an index indicating a degree of slope of the vertical curve. The gradient calculating module 115 may calculate the gradient by calculating a sum of the differences in grades at each upward sloping part of the vertical curve. Referring to FIG. 3, the gradient calculating module 115 may calculate the gradient by calculating a difference in grade at each upward sloping part of the vertical curve for the road on which the vehicle is moving, in a movement direction of the vehicle, and by calculating a sum of the differences in grades. In the exemplary embodiment, a downward sloping part of the vertical curve may be excluded from consideration when calculating the gradient. When the movement direction is left-to-right in the graph, a height of each upward sloping part of the vertical curve may correspond to $h_1$ and $h_3$. In this instance, when a length of a unit section is 'L', the gradient H may be calculated to be '$(h_1+h_3)/L$'. When the movement direction is right-to-left in the graph, a height of each upward sloping part of the vertical curve may correspond to $h_4$ and $h_2$. In this instance, the gradient H may be calculated to be '$(h_2+h_4)/L$'. The gradient calculating module 115 may calculate the gradient by obtaining the vertical curve for the road using GPS information providing a location of the vehicle or an output value of an inclination sensor sensing an inclination of the vehicle to a road surface, and by calculating a difference in grade of the vertical curve.

The calculating unit 110 may calculate the calculated topographical factor, the curvature and/or the gradient and the calculated behavioral factor, the acceleration and/or the speed as variables per unit time [dt] to process the topographical factor and the behavioral factor into real-time data. In particular, since an error occurrence rate of an instantaneous variable is high, the calculating unit 110 may calculate the real-time data for the topographical factor and the behavioral factor using a logging function through comparative analysis with previous data.

Also, the calculating unit 110 may calculate an eco-driving index of the road (hereinafter referred to as, an R index) using the topographical factor and behavioral factor. Assume that the topographical factor includes both the curvature and the gradient and the behavioral factor includes both the acceleration and the speed in the following exemplary embodiments. The calculating unit 110 may calculate the R index by subtracting each variable from a reference value of the R index. For example, the calculating unit 110 may calculate the R index by subtracting a sum of the acceleration, the curvature, the gradient, and the speed from the reference value, as shown in Equation 1.

$$dR\ \text{index}=\text{reference value of } dR\ \text{index}-[dr_a+dr_B+dr_H+dr_{\Delta v}] \qquad \text{Equation 1}$$

where $dr_a$ denotes an instantaneous acceleration, $dr_B$ denotes an instantaneous curvature, $dr_H$ denotes an instantaneous gradient, and $dr_{\Delta v}$ denotes an instantaneous speed. The instantaneous acceleration $dr_a$, the instantaneous curvature $dr_B$, the instantaneous gradient $dr_H$, and the instantaneous speed $dr_{\Delta v}$ may be defined in a numerical value through comparative analysis with previous data, as follows:

$$dr_a=(|a_i-a_{i-1}|)*\alpha_1$$

$$dr_B=\{(|\theta_{Bi}-\theta_{Bi-1}|)-\alpha_2\}/\alpha_2$$

$$dr_H=(\theta_{Hi}-\theta_{Hi-1})/\alpha_3$$

$$dr_{\Delta v}=(|v_i-v_{i-1}|)*\alpha_4$$

where $\alpha_1$ denotes a parameter of an acceleration variable, $\alpha_2$ denotes a parameter of a curvature variable, $\alpha_3$ denotes a parameter of a gradient variable, and $\alpha_4$ denotes a parameter of a speed variable. Also, $a_i$ denotes an instantaneous acceleration at a current time 'i', $\theta_{Bi}$ denotes an instantaneous curvature at a current time 'i', $\theta_{Hi}$ denotes an instantaneous gradient at a current time 'i', and $v_i$ denotes a speed scalar value at a current time 'i'. In this instance, the parameters $\alpha_I$, $\alpha_2$, $\alpha_3$, and $\alpha_4$ of each variable need proper adjustment through tuning, for example, per area. That is, the parameters $\alpha_1$, $\alpha_2$, $\alpha_3$, and $\alpha_4$ of each variable may be set flexibly to be a tuned value by experience or experiments.

Accordingly, the calculating unit 110 may calculate various factors affecting driving, that is, the topographical factor and the behavioral factor, per unit time in real time, and may calculate the R index using the calculated factors.

Also, the calculating unit 110 may grade the topographical factor and the behavioral factor. For example, as shown in FIG. 4, the calculating unit 110 may classify the instantaneous acceleration, the instantaneous curvature, the instantaneous gradient, and the instantaneous speed into A to F grades based on the value of each variable. In this instance, relative points A to F may be assigned to each variable, and point A may correspond to a highest point, and point F may correspond to a lowest point. A reference value used to grade each variable may be determined through learning using log data of each variable, for example, an empirical value, and may correspond to a real-time reference value. The learning may conduct a personal computer (PC)-based analysis, and may be based on a correlation between each variable and the R index calculated using a previous driving record. That is, the reference value may be calculated through conducting a PC-based analysis of a correlation between a change of each variable and an instantaneous fuel efficiency by comparing log data recorded for each variable in real time to the instantaneous fuel efficiency. The R index may have a number of cases for each variable. For example, in a case of traveling a certain area four times, subsequently the R index is calculated to be all D and each variable is calculated to be E+B+B+E, C+D+D+D, B+D+D+B, and A+F+F+A. The calculating unit 110 may memorize all the number of cases, and when collected real-time data of each variable matches one of the number of cases, E+B+B+E, C+D+D+D, B+D+D+B, and A+F+F+A, may set the R index to be D immediately absent separate calculation.

Figure 5:
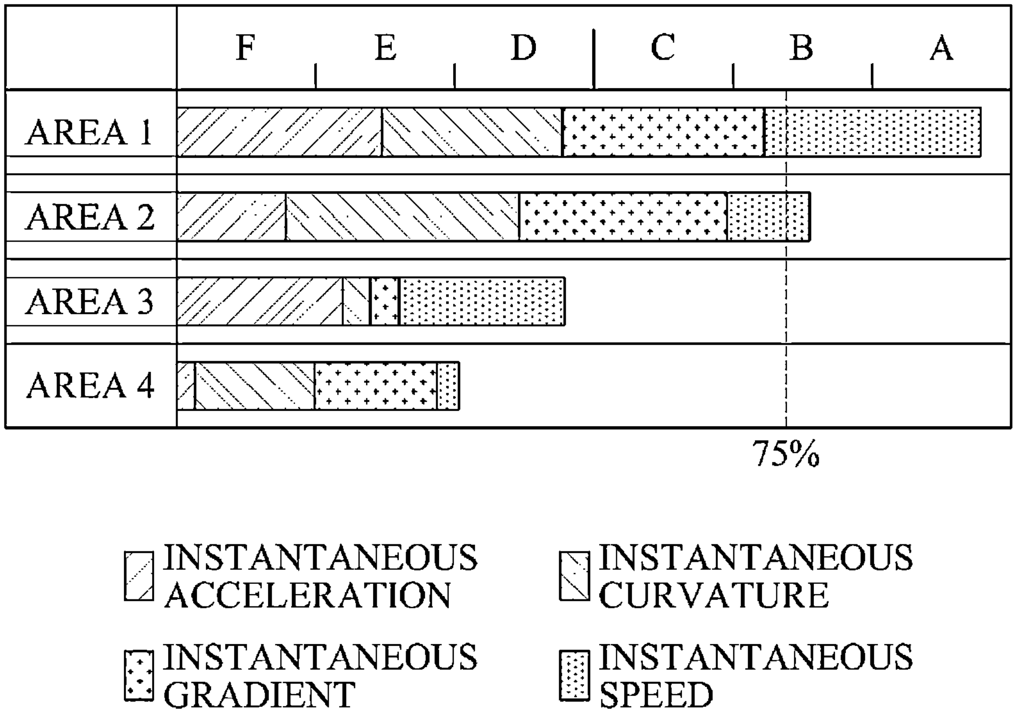

Also, the calculating unit 110 may calculate an average of the topographical factor, an average of the behavioral factor, and an average of the R index per unit section, for example, 1 kilometer (km), or for the entire roadway section, using log data of each variable calculated in real time and the R index. For example, as shown in FIG. 5, the R index calculated using the instantaneous acceleration, the instantaneous curvature, the instantaneous gradient, and the instantaneous speed may be graded per unit section.

The providing unit 120 may provide real-time notification information to a driver based on the topographical factor and the behavioral factor calculated in real time.

For example, the providing unit 120 may generate a light signal of an indicator lamp as the real-time notification information when at least one of the topographical factor and the behavioral factor fails to match the reference value. In this instance, the light signal may be output from an indicator lamp provided in at least one of a car black box device, an OBD device, a navigation device, and a mobile terminal. Also, the providing unit 120 may generate the light signal in different types of lights depending on the topographical factor and the behavioral factor. For example, as shown in FIG. 6, the providing unit 120 may generate a steady light signal when the topographical factor fails to match the reference value, and may generate a flash light signal when the behavioral factor fails to match the reference value. When both the topographical factor and behavioral factor fail to match the reference value, the providing unit 120 may generate a blue light signal. The real-time notification information using the light signal of the indicator lamp may be generated for each variable or the R index.

As another example, when at least one of the topographical factor and behavioral factor fails to match the reference value, the providing unit 120 may generate an alarm signal as the real-time notification information. The alarm signal may be output from a sound output device provided in at least one of a car black box device, an OBD device, a navigation device, and a mobile terminal. Also, the providing unit 120 may generate the alarm signal in different types of alarms depending on the topographical factor and the behavioral factor. For example, when the topographical factor fails to match the reference value, the providing unit 120 may generate a warning beep of a short signal interval, and when the behavioral factor fails to match the reference value, may generate a warning beep of a longer signal interval than the warning beep generated when the topographical factor fails to match the reference value. Also, as shown in FIG. 6, when start-up succeeds within ten seconds after warm-up or when start-up fails within thirty seconds after warm-up, the providing unit 120 may generate a warning beep of a short signal interval, and when the R index fails to match the reference value, may generate a continuous alternating alarm signal until the R index matches the reference value. The real-time notification information using the alarm signal may be generated for each variable or the R index. Also, when at least one of the topographical factor and the behavioral factor fails to match the reference value, the providing unit 120 may provide the real-time notification information using both the light signal of the indicator lamp and the alarm signal.

As still another example, the providing unit 120 may generate the real-time notification information using a video signal and an audio signal when at least one of the topographical factor and the behavioral factor fails to match the reference value. In this instance, the video signal and the audio signal may be output from a display device and a sound output device provided in at least one of a car black box device, an OBD device, a navigation device, and a mobile terminal. For example, when at least one of the topographical factor and the behavioral factor fails to match the reference value, the providing unit 120 may generate the video signal to execute a pop-up window or the audio signal to output a predetermined voice announcement.

Accordingly, when the real-time data of each variable or the R index fails to match the reference value, the providing unit 120 may generate, as the real-time notification information, at least one of the light signal of the indicator lamp, the alarm signal, the video signal, and the audio signal, to provide notification to the driver that the driver fails to drive economically and to motivate the driver to change a driving pattern naturally. In the exemplary embodiment, the reference value used to generate the real-time notification information may be determined through learning using log data of a variable corresponding to at least one of the topographical factor and the behavioral factor, for example, an empirical value, and economic driving may be recognized through relative analysis of the real-time data. For example, when the real-time data of each variable or the R index is reduced to a level less than or equal to 75% of log data of a previous time, the providing unit 120 may output real-time notification information to enable the driver to recognize the decrease. Also, the providing unit 120 may provide learning information about an economic driving behavior based on the change of each variable, for example, video contents for economic driving. In this instance, the learning for the economic driving behavior may be provided through conducting a PC-based analysis of the correlation between the change of each variable and the fuel efficiency.

Figure 7:
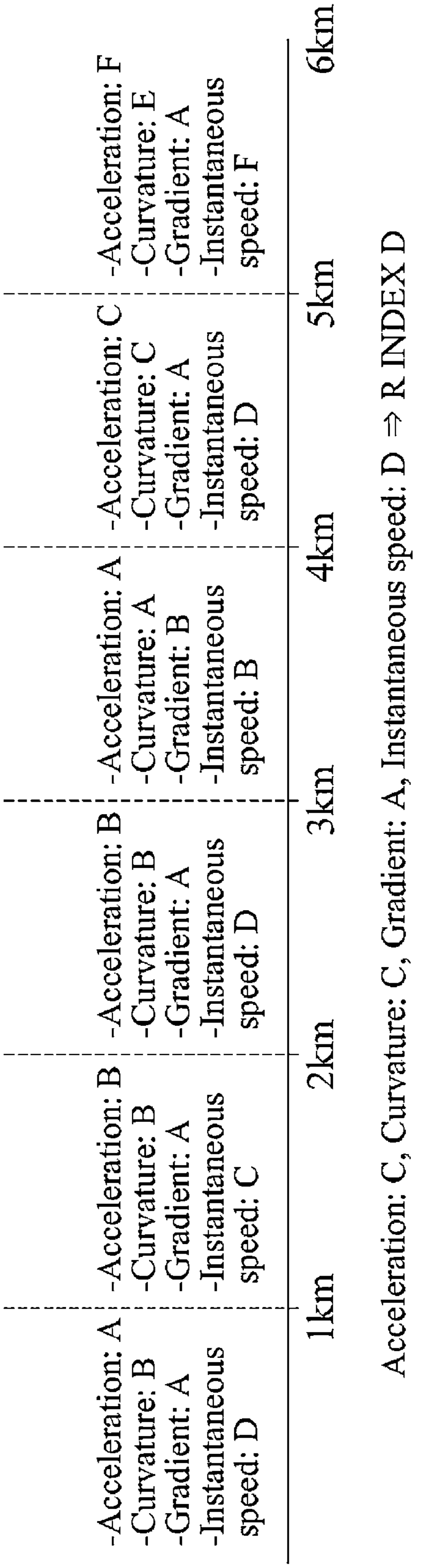
FIG. 7 is a diagram illustrating an example of a display of a factor affecting an eco-driving index per unit section according to an exemplary embodiment of the present invention.

Also, the providing unit 120 may display the topographical factor, the behavioral factor, and/or the R index of a predetermined roadway section through at least one of a car black box device, an OBD device, a navigation device, and a mobile terminal, in response to a request by the driver. In this instance, the topographical factor, the behavioral factor, and/or the R index may be displayed for each of at least one area among a unit section, a link section, and a section between junctions along the entire roadway section. For example, as shown in FIG. 5, the providing unit 120 may display the topographical factor, the behavioral factor, and the R index for each area. In this example, a first area may exhibit proper levels of four variables, and a determination may be made that the driver drove along the first area economically. Further, a second area may exhibit normal levels of curvature and gradient, and a determination may be made that a speed variation caused by acceleration and deceleration affected economic driving slightly. A third area may exhibit a normal level of driving behavior, and a determination may be made that an unsuitable route for economic driving was set. A fourth area may exhibit sudden acceleration and deceleration affecting economic driving significantly, and a determination may be made that the driver needs to be educated on economic driving behavior. As another example, as shown in FIG. 7, the providing unit 120 may display a grade of each variable per unit section, for example, a 1 km long section, and may display an average grade of each variable per unit section of the entire roadway section and a total grade of the R index. In FIG. 7, relative points A to F are assigned to each variable needed to calculate the R index, that is, the acceleration, the curvature, the gradient, and the speed. Each variable may be measured per unit section while driving along a 6 km long roadway section. The R index may be calculated to be "D" based on a point "C" of the acceleration, a point "C" of the curvature, a point "A" of the gradient, and a point "D" of the speed for the entire 6 km long roadway section, and may be displayed to the user. The analysis index R may be also graded A to F.

Figure 8:
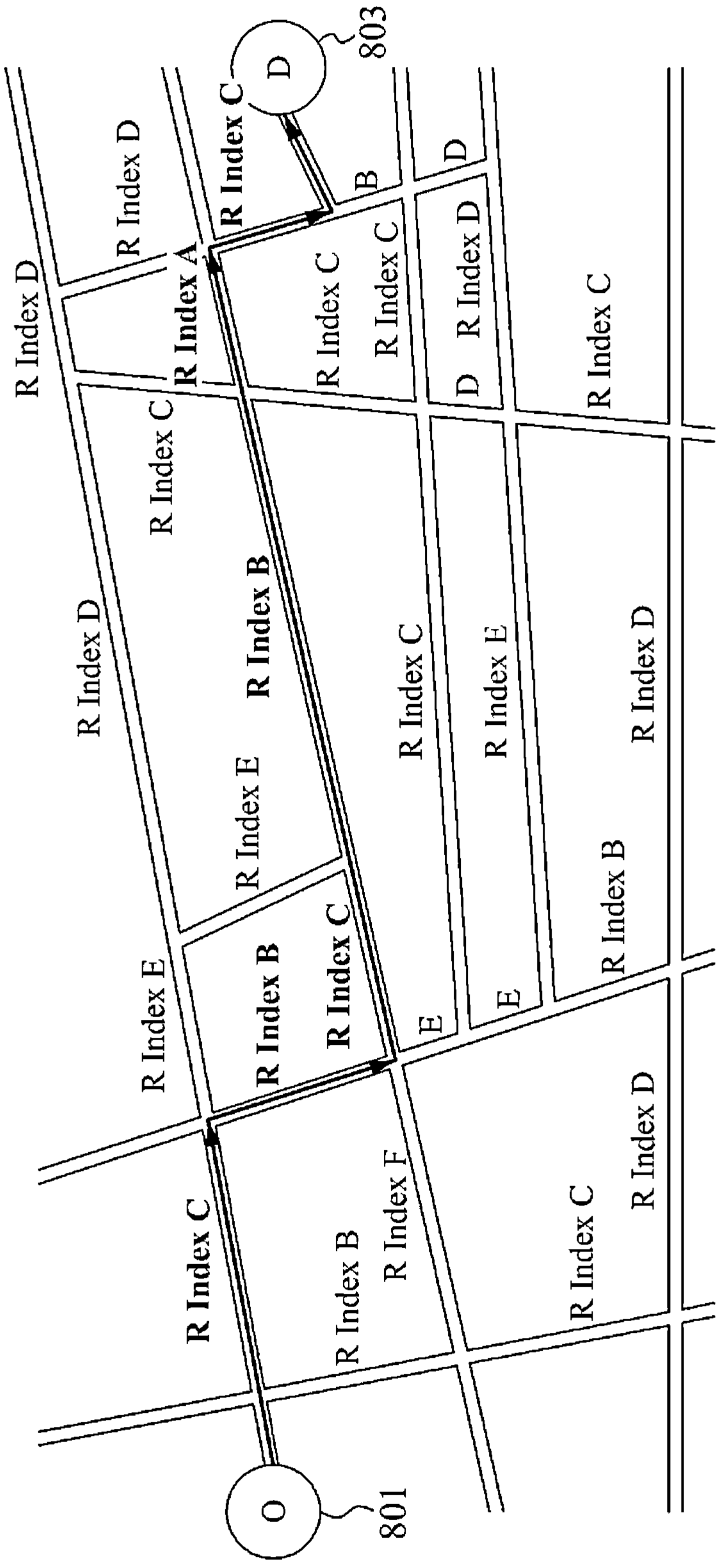
FIG. 8 is a diagram illustrating an example of a display of a map having an eco-driving index calculated through a driving log according to an exemplary embodiment of the present invention.

Also, the providing unit 120 may generate an eco-map using the topographical factor, the behavioral factor, and/or the R index calculated through a driving log for each road based on various standards, for example, per time slot, on each day of week, and the like. For example, as shown in FIG. 8, the providing unit 120 may generate and display, as an eco-map, a grade of the R index for each section between junctions using the driving log of the driver. In this instance, the eco-map may be generated using an average grade of an R index for a road on which the driver moved iteratively. Also, the providing unit 120 may set a route suitable for economic driving between an origin 801 and a destination 803 designated by the user, using the eco-map. That is, the providing unit 120 may determine, to be a final route, a route having an R index of a highest grade among possible routes between the origin 801 and the destination 803, and may provide the final route to the driver.

The displaying of the topographical factor, the behavioral factor, the R index, and the eco-map may be implemented in any device that may display data to users visually, for example, a PC, a mobile terminal, a car black box device, a navigation device, an OBD device, a server system, and the like.

Various functions of the real-time information service system according to the present invention may be implemented as hardware and/or software including at least one of an integrated circuit for signal processing and an application-specific integrated circuit.

Figure 9:
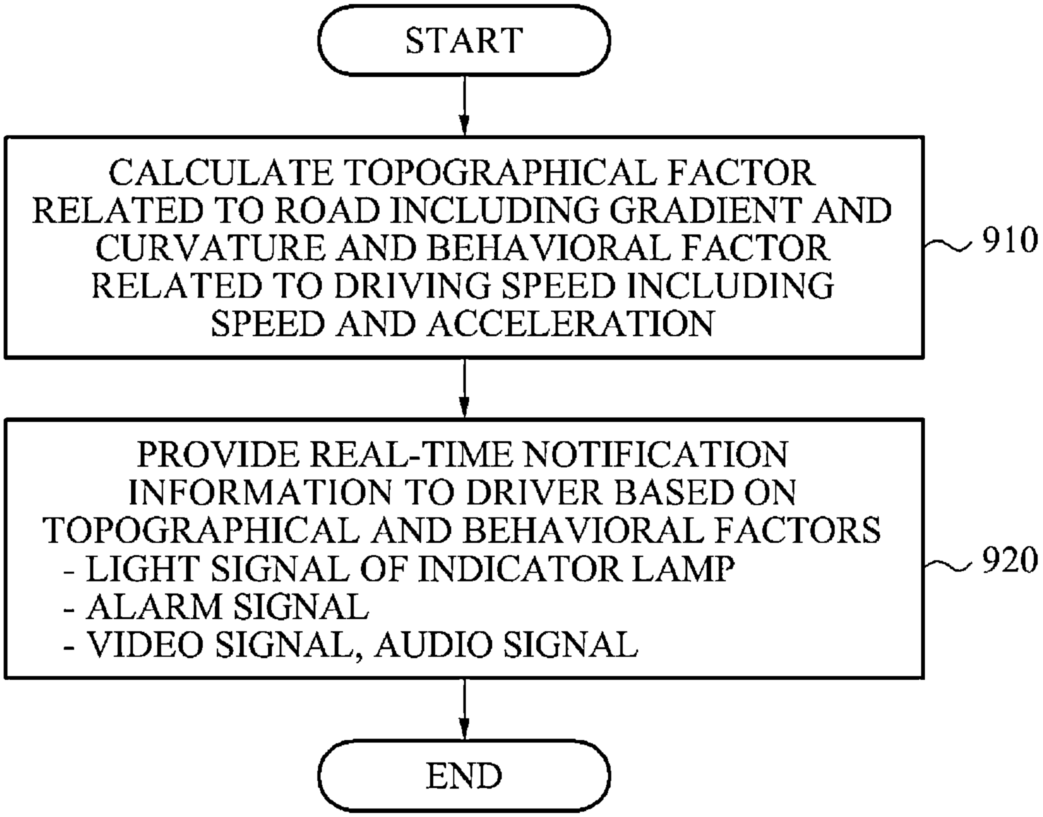
FIG. 9 is a flowchart illustrating a real-time information service method for providing real-time notification information about a factor affecting an eco-driving index according to an exemplary embodiment of the present invention.

FIG. 9 is a flowchart illustrating a real-time information service method for providing real-time notification information about a factor affecting the eco-driving index according to an exemplary embodiment of the present invention. The real-time information service method according to an exemplary embodiment may be performed by the real-time information service system of FIG. 1.

Referring to FIG. 9, in operation 910, the real-time information service system may calculate, as a factor affecting driving, a topographical factor, for example, a shape of a road, and a behavioral factor, for example, a travel speed directly related to a driving pattern of a driver. Here, the topographical factor may include at least one of a curvature and a gradient of the road, and the behavioral factor may include at least one of an acceleration, for example, a rate of speed change, and a speed, for example, a constant speed drive, while driving. In this instance, the real-time information service system may calculate an acceleration referring to an index indicating a rate of speed change per unit time in $m/s^2$ and a speed variation referring to an index indicating a constant speed drive in m/s using GPS information providing a location of a vehicle or an output value of a speed sensor sensing a speed of a vehicle. Also, the real-time information service system may calculate a curvature through a change in intersection angle of a horizontal curve for the road using at least one of GPS information providing a location of a vehicle and an image taken with a car front view camera. Also, the real-time information service system may calculate a gradient through a difference in grade of a vertical curve for the road using at least one of GPS information providing a location of a vehicle and an output value of an inclination sensor sensing an inclination of a vehicle. The real-time information service system may calculate the topographical factor, the curvature and/or the gradient, and the behavioral factor, the acceleration and/or the speed as variables per unit time [dt], to process the topographical factor and the behavioral factor into real-time data. In particular, the real-time information service system may calculate the real-time data of the topographical factor and the behavioral factor using a logging function through comparative analysis with previous data.

In operation 920, the real-time information service system may provide real-time notification information to a driver based on the topographical factor and behavioral factor calculated in real time. For example, the real-time information service system may generate a light signal of an indicator lamp as the real-time notification information when at least one of the topographical factor and the behavioral factor fails to match a reference value. In this instance, the light signal may be outputted from an indicator lamp provided in at least one of a car black box device, an OBD device, a navigation device, and a mobile terminal. Also, the real-time information service system may generate the light signal in different types of lights depending on the topographical factor and the behavioral factor. As another example, the real-time information service system may generate an alarm signal as the real-time notification information when at least one of the topographical factor and the behavioral factor fails to match the reference value. In this instance, the alarm signal may be outputted from a sound output device provided in at least one of a car black box device, an OBD device, a navigation device, and a mobile terminal.

Also, the real-time information service system may generate the alarm signal in different types of alarms depending on the topographical factor and the behavioral factor. Here, the real-time information service system may provide the real-time notification information, as necessary, using both the light signal of the indicator lamp and the alarm signal when at least one of the topographical factor and the behavioral factor fails to match the reference value. As still another example, the real-time information service system may generate at least one of a video signal, for example, a pop-up window, and an audio signal, for example, a voice announcement, as the real-time notification information when at least one of the topographical factor and the behavioral factor fails to match the reference value. In this instance, the video signal and the audio signal may be outputted from a display device and a sound output device provided in at least one of a car black box device, an OBD device, a navigation device, and a mobile terminal. Accordingly, when the real-time data of each variable or the R index fails to match the reference value, the real-time information service system may generate, as the real-time notification information, at least one of the light signal of the indicator lamp, the alarm signal, the video signal, and the audio signal, to provide notification that the driver fails to drive economically and to motivate the driver to alter driving patterns, naturally.

Among the real-time notification information described herein, the light signal and the video signal may be referred to as a visual signal, and the alarm signal and the audio signal may be referred to as an auditory signal.

In the exemplary embodiment, a reference value used to generate the real-time notification information may be determined through learning using log data of a variable corresponding to at least one of the topographical factor and the behavioral factor, for example, an empirical value, and eco-driving may be recognized through relative analysis of the real-time data.

The real-time information service method according to the present invention may include an additional operation based on various functions of the real-time information service apparatus described with reference to FIGS. 1 through 8.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to the exemplary embodiments, an economic driving environment may be created effectively by recognizing a factor affecting improvement of an eco-driving index in real time and by providing real-time notification information about the factor affecting the improvement. Accordingly, economic driving may be put into practice naturally and effectively through the real-time notification information while driving. Also, an eco-map may be generated by calculating an eco-driving index for each road through a driving log based on various standards, for example, per time slot, on each day of week, and the like, and the eco-map may be used in setting or searching for a route.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A real-time information service apparatus, comprising:

a calculating unit to calculate a topographical factor related to a road and a behavioral factor related to a speed to produce an eco-driving index of the road; and a providing unit to provide real-time notification information to a driver based on the topographical factor and the behavioral factor;

wherein the calculating unit calculates the topographical factor per unit time and the behavioral factor per unit time for the road, and calculates an average of the topographical factor and an average of the behavioral factor for each of at least one area among a unit section, a link section, and a section between junctions along the entire road;

wherein the providing unit displays the topographical factor and the behavioral factor for each area of a predetermined road section in response to a request by the driver, and displays the average of the topographical factor and the average of the behavioral factor;

wherein the topographical factor includes a gradient of the road calculated per unit time and a curvature of the road calculated per unit time; and wherein the calculating unit classifies variables associated with the topographical factor or the behavioral factor into at least two grades, stores different combinations with respect to the at least two grades of variables associated with the topographical factor and the behavioral factor, and produces the eco-driving index of the road by selecting at least one combination from the different combinations stored.

2. The apparatus of claim 1, wherein the behavioral factor includes at least one of a speed in meters per second (m/s) and an acceleration in meters per second$^2$ (m/s$^2$) calculated per unit time.

3. The apparatus of claim 1, wherein the providing unit generates a light signal of an indicator lamp as the real-time notification information when at least one of the topographical factor and the behavioral factor fails to match a reference value.

4. The apparatus of claim 3, wherein the providing unit generates the light signal in different types of lights depending on the topographical factor and the behavioral factor.

5. The apparatus of claim 1, wherein the providing unit generates an alarm signal as the real-time notification information when at least one of the topographical factor and the behavioral factor fails to match a reference value.

6. The apparatus of claim 5, wherein the providing unit generates the alarm signal in different types of alarms depending on the topographical factor and the behavioral factor.

7. The apparatus of claim 1, wherein the providing unit generates at least one of a video signal and an audio signal as the real-time notification information when at least one of the topographical factor and the behavioral factor fails to match a reference value.

8. The apparatus of claim 3, wherein the reference value is determined through learning using log data of at least one of the topographical factor and the behavioral factor.

9. The apparatus of claim 1, wherein the calculating unit grades the topographical factor and the behavioral factor.

10. The apparatus of claim 9, wherein a reference value for the grading is determined through learning using log data of at least one of the topographical factor and the behavioral factor.

11. The apparatus of claim 1, wherein the providing unit provides the real-time notification information in a type of signal being outputted from at least one terminal of a mobile terminal, a navigation terminal, and a black box.

12. The apparatus of claim 1, wherein the providing unit displays the topographical factor and the behavioral factor for each unit section through at least one terminal of a mobile terminal, a navigation terminal, and a black box.

13. The apparatus of claim 1, wherein at least one of the topographical factor for each unit section and the behavioral factor for each unit section is used as reference data for setting a route.

14. A real-time information service method, comprising:

Calculating, by a calculating unit, a topographical factor related to a road and a behavioral factor related to a speed to produce an eco-driving index of the road; and providing real-time notification information to a driver based on the topographical factor and the behavioral factor;

wherein the calculating calculates the topographical factor per unit time and the behavioral factor per unit time for the road, and calculates an average of the topographical factor and an average of the behavioral factor for each of at least one area among a unit section, a link section, and a section between junctions along the entire road;

wherein the providing includes displaying the topographical factor and the behavioral factor for each area of a predetermined road section in response to a request by the driver, and displaying the average of the topographical factor and the average of the behavioral factor;

wherein the topographical factor includes a gradient of the road calculated per unit time and a curvature of the road calculated per unit time; and wherein the calculating unit classifies variables associated with the topographical factor or the behavioral factor into at least two grades, stores different combinations with respect to the at least two grades of variables associated with the topographical factor and the behavioral factor, and produces the eco-driving index of the road by selecting at least one combination from the different combinations stored.

15. The method of claim 14, wherein the behavioral factor includes at least one of a speed in meters per second (m/s) and an acceleration in meters per second$^2$ (m/s$^2$) calculated per unit time.

16. The method of claim 14, wherein the providing comprises generating a visual signal or an auditory signal as the real-time notification information when at least one of the topographical factor and the behavioral factor fails to match a reference value.

17. The method of claim 16, wherein the reference value is determined through learning using log data of at least one of the topographical factor and the behavioral factor.

18. A non-transitory computer-readable recording medium comprising a program for implementing the method of claim 14.

* * * * *